US012681417B2

(12) United States Patent
Izumiya et al.

(10) Patent No.: US 12,681,417 B2
(45) Date of Patent: Jul. 14, 2026

(54) IMAGE FORMING SYSTEM, CONTROL PARAMETER SETTING METHOD, AND RECORDING MEDIUM

(71) Applicant: Konica Minolta, Inc., Tokyo (JP)

(72) Inventors: Yumiko Izumiya, Hachioji (JP); Hiroyuki Maruyama, Sagamihara (JP); Hitoshi Asano, Toyokawa (JP); Hiroyuki Yoshikawa, Toyohashi (JP); Akimasa Ishikawa, Hino (JP); Yasuo Koyanagi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/883,613

(22) Filed: Sep. 12, 2024

(65) Prior Publication Data

US 2025/0093806 A1 Mar. 20, 2025

(30) Foreign Application Priority Data

Sep. 19, 2023 (JP) ................................ 2023-150666

(51) Int. Cl.
*G03G 15/00* (2006.01)

(52) U.S. Cl.
CPC ..... *G03G 15/5029* (2013.01); *G03G 15/5062* (2013.01); *G03G 15/6502* (2013.01)

(58) Field of Classification Search
CPC ........... G03G 15/5029; G03G 15/5062; G03G 15/6502
See application file for complete search history.

(56) References Cited

U.S. PATENT DOCUMENTS

| | | | |
|---|---|---|---|
| 2017/0219980 A1 | 8/2017 | Sato | |
| 2022/0334520 A1 | 10/2022 | Nishi | |
| 2023/0156127 A1 * | 5/2023 | Kimata | H04N 1/00079 358/1.13 |
| 2023/0176515 A1 | 6/2023 | Yoshikawa et al. | |

FOREIGN PATENT DOCUMENTS

| | | |
|---|---|---|
| JP | 2020089503 A | 6/2020 |
| JP | 2020097170 A | 6/2020 |
| JP | 2022-089505 A | 6/2022 |

OTHER PUBLICATIONS

Japanese Office Action (JPOA) dated Oct. 22, 2024 issued for Japanese patent application No. 2023-150666 and its English machine translation.
Extended European Search Report (EESR) dated Feb. 12, 2025 for European Patent Application No. 24200742.5.
Japanese Office Action (JPOA) dated Apr. 1, 2025 for Japanese Patent Application No. 2023-150666; English translation.

* cited by examiner

*Primary Examiner* — Hoang X Ngo
(74) *Attorney, Agent, or Firm* — RANKIN, HILL & CLARK LLP

(57) ABSTRACT

An image forming system including: a hardware processor, wherein the hardware processor is configured to perform, a first control parameter determination operation that determines a value of a control parameter for sheet processing; a second control parameter determination operation that determines the value of the control parameter for the sheet processing by a method different from the first control parameter determination operation; and a selection operation configured to be capable of setting which of the first control parameter determination operation and the second control parameter determination operation is used to determine the value of at least one of a plurality of control parameters.

19 Claims, 7 Drawing Sheets

FIG. 3

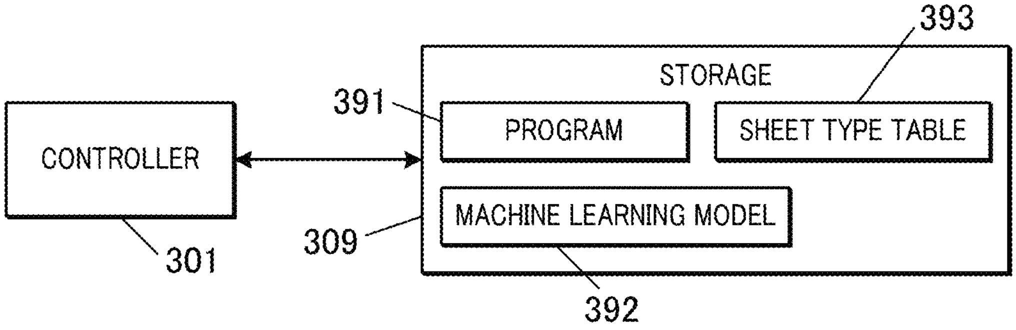

FIG. 4

| CATEGORY | CONTROL PARAMETER NAME | SETTING EXAMPLE 1 | SETTING EXAMPLE 2 | VARIABLE |
|---|---|---|---|---|
| AIR SHEET FEED | PFU TRAY LEADING END FAN AIR VOLUME | 2 | 2 | – |
| | PFU TRAY SIDE FAN AIR VOLUME | 2 | 2 | – |
| | PFU REGISTRATION LOOP AMOUNT | 2 | 2 | – |
| TRANSFER | TRANSFER TRAILING END CORRECTION CURRENT VALUE | 2 | 2 | – |
| | TRANSFER CURRENT VALUE | 1 | 2 | OK |
| | TRANSFER LEADING END CORRECTION CURRENT VALUE | 2 | 2 | – |
| | SEPARATED AC APPLIED VOLTAGE | 2 | 2 | – |
| | SEPARATED DC APPLIED VOLTAGE | 2 | 2 | – |
| FIXING | UPPER FIXING CONTROL TEMPERATURE | 1 | 1 | – |
| | LOWER FIXING CONTROL TEMPERATURE | 1 | 1 | – |
| | FIXING SEPARATION FAN AIR VOLUME | 2 | 1 | – |
| | FIXING ROLLER SPEED | 2 | 1 | – |
| SHEET STATIC ELIMINATION | STATIC ELECTRICITY REMOVAL CURRENT | 2 | 1 | – |

IMAGE FORMING SYSTEM, CONTROL PARAMETER SETTING METHOD, AND RECORDING MEDIUM

BACKGROUND OF THE INVENTION

Technical Field

The present invention relates to an image forming system, a control parameter setting method, and a recording medium.

Description of Related Art

The image forming system performs an image forming operation of conveying a recording medium to an image forming position, applying a color material to the recording medium, and fixing the color material. The manner in which the color material spreads and the manner in which the color material is fixed vary depending on the characteristics of the recording medium, such as its material. Therefore, the image forming system performs an image forming operation with parameters such as temperature and pressure appropriate for each type of recording medium.

Conventionally, as disclosed in Japanese Unexamined Patent Publication No. 2020-097170, there is a technology for identifying a sheet type based on a measurement result of physical properties of a sheet by a media sensor. The image forming system sets values held in advance as control parameters corresponding to the identified sheet type. In this technique, there is a problem that a control parameter is not accurately set for a sheet type which is not registered in advance. On the other hand, there is a technique of directly setting control parameters in accordance with a combination of a plurality of sheet physical properties obtained from a measurement result of a media sensor or the like. Japanese Unexamined Patent Publication No. 2020-089503 discloses a technique of outputting and setting control parameters for sheet physical properties by using a machine learning model or a statistical method. That is, in this technology, the sheet type does not need to be specified.

However, the control parameters are numerous. The processing of uniformly optimizing these combinations based on data of a large number of sheet physical properties may require a large amount of calculation. As a result, it is difficult for the image forming system to reflect the optimized control parameters in real time during the high-speed image forming operation.

An object of the present invention is to provide an image forming system, a control parameter setting method, and a recording medium including a program, which are capable of more appropriately setting operation related to image formation while suppressing a decrease in productivity.

SUMMARY OF THE INVENTION

One aspect of the present disclosure provides an image forming system including: a hardware processor, wherein the hardware processor is configured to perform, a first control parameter determination operation that determines a value of a control parameter for sheet processing; a second control parameter determination operation that determines the value of the control parameter for the sheet processing by a method different from the first control parameter determination operation; and a selection operation configured to be capable of setting which of the first control parameter determination operation and the second control parameter determination operation is used to determine the value of at least one of a plurality of control parameters.

Furthermore, another aspect of the present disclosure provides a control parameter setting method including: first control parameter determining that determines a value of a control parameter for sheet processing; second control parameter determining that determines the value of the control parameter for the sheet processing by a method different from the first control parameter determining; and selecting capable of setting which of the first control parameter determining and the second control parameter determining is used to determine the value of at least one of a plurality of control parameters.

Furthermore, another aspect of the present disclosure provides a non-transitory computer readable recording medium storing a program causing a computer to perform: first control parameter determining that determines a value of a control parameter for sheet processing; second control parameter determining that determines the value of the control parameter for the sheet processing by a method different from the first control parameter determining; and selecting capable of setting which of the first control parameter determining and the second control parameter determining is used to determine the value of at least one of a plurality of control parameters.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein:

FIG. 3 is a block diagram illustrating a functional configuration related to a control operation in an image forming apparatus;

FIG. 4 is a table illustrating some control parameters and their operation settings;

DETAILED DESCRIPTION

Hereinafter, one or more embodiments of the present invention will be described with reference to the drawings. However, the scope of the invention is not limited to the disclosed embodiments.

Hereinafter, embodiments of the present invention will be described with reference to the drawings.

Figure 1:
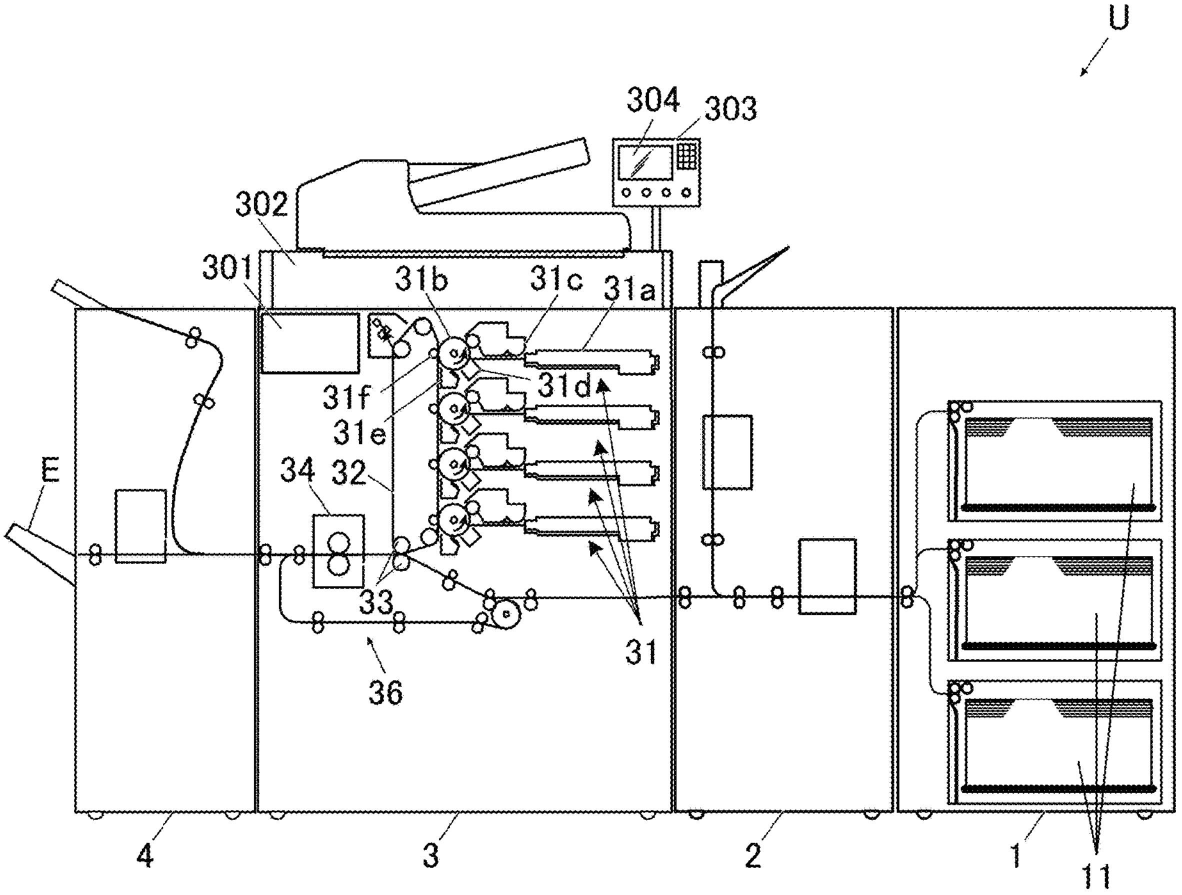
FIG. 1 is a diagram illustrating an overall configuration of an image forming system according to the present embodiment.

FIG. 1 illustrates an overall configuration of an image forming system U according to the present embodiment.

The image forming system U includes a sheet feed device 1, a sheet characteristic detection device 2, an image forming apparatus 3 and a post-processing apparatus 4.

The sheet feed device 1 includes a plurality of sheet feed trays 11. The sheet feed device 1 feeds a medium (sheet) on which an image is to be recorded one by one from any one of the sheet feed trays 11 which is selected and set. The sheet feed tray 11 feeds sheets by, for example, air sheet feed in which air is blown to separate a plurality of sheets and the separated sheets are delivered with their positions aligned.

The sheet characteristic detection device 2 includes a plurality of sensors for measuring physical properties and the like of the sheet. The sheet characteristic detection device 2 measures the sheet fed from the sheet feed device 1 on its path by the plurality of sensors. The sheet characteristic detection device 2 can identify physical properties and the like (characteristic information) of the sheet based on the measurement results. The sheet characteristic detection device 2 may output the physical property value obtained by the measurement as it is to the outside, for example, the image forming apparatus 3. That is, the estimation of the sheet may be performed outside the sheet characteristic detection device 2. The sensor type and position of the sheet characteristic detection device 2 will be described later.

The image forming apparatus 3, for example, forms the image of image data read from a document on a sheet and outputs the image. The image forming apparatus 3 forms the image on the sheet by an electrophotographic method based on the image data received from an external device (not illustrated), and outputs the sheet. That is, the image forming apparatus 3 is a multifunction peripheral. The image forming apparatus 3 may be connected to an external device, for example, a PC via a local area network (LAN) or the like.

The image forming apparatus 3 includes a controller 301 (hardware processor), a document reading section 302, an operation acceptance section 303, and a display part 304.

The controller 301 integrally controls the operation of the image forming apparatus 3. The controller 301 includes a central processing unit (CPU), a random access memory (RAM), and the like. The CPU is a hardware processor that performs various settings and operations related to image formation in accordance with an operation signal input from the operation acceptance section 303 or an instruction signal received by a communication section (not illustrated).

The document reading section 302 reads the image of the document placed on a document plate or an auto document feeder (ADF). The document reading section 302 scans and exposes the document by an optical system of a scanning exposure device, and reads its reflected light by a line image sensor to obtain an image signal. This image signal is subjected to processing such as A/D conversion, shading correction, and compression to generate image data.

The operation acceptance section 303 accepts an input operation from the outside by a user or the like. The operation acceptance section 303 includes a touch screen provided on a screen of the display part 304, and various hard keys arranged around a screen of the display part 304. The accepted operation content is converted into an operation signal corresponding to the content, and is output to the controller 301. The touch screen may be, for example, any one of a pressure-sensitive type, an electrostatic type, and an optical type.

The display part 304 includes, for example, a color liquid crystal display, and displays various kinds of information based on the control of the controller 301.

The image forming apparatus 3 applies and fixes a color material to a sheet on the basis of image data as a formed target. The image forming apparatus 3 causes, for example, toners of Y color (yellow), M color (magenta), C color (cyan), and black to adhere to a surface of a sheet in accordance with image data. The image forming apparatus 3 fixes the toner attached to the surface of the sheet by heating and pressing the toner to form the image. The image forming apparatus 3 includes four writing sections 31, an intermediate transfer belt 32, a secondary transfer roller 33, and a fixing section 34 as components to perform an image forming operation.

Four writing sections 31 are arranged in series (tandem) along a belt surface of the intermediate transfer belt 32 to form images in C, M, Y and K colors. The configuration of each writing section 31 may be the same among the colors. For example, the writing section 31 includes an optical scanning section 31*a*, a photoreceptor 31*b* (image bearing member), a developing section 31*c*, a charging section 31*d*, a cleaning section 31*e*, and a primary transfer roller 31*f*.

In each of the writing sections 31, the charging section 31*d* uniformly charges the photoreceptor 31*b*. The optical scanning section 31*a* emits a light beam based on original image data to scan and expose the charged photoreceptor 31*b*, thereby forming an electrostatic latent image. The developing section 31*c* supplies a color material such as toner to the electrostatic latent image to develop the image, thereby forming the image on the photoreceptor 31*b*.

The images formed on the photoreceptors 31*b* of the four writing sections 31 are sequentially transferred and superimposed onto the intermediate transfer belt 32 by the respective primary transfer rollers 31*f*. By this transfer (primary transfer), the image of each color is formed on the intermediate transfer belt 32. The intermediate transfer belt 32 circulates while being wound around a plurality of rollers. After the primary transfer, the color material remaining on the photoreceptor 31*b* is removed by the cleaning section 31*e*.

The image forming apparatus 3 causes the sheet to pass through the position of the secondary transfer roller 33 in accordance with timing at which the image on the intermediate transfer belt 32 that circulates reaches the position of the secondary transfer roller 33. The secondary transfer roller 33 includes a pair of rollers. One of the rollers is pressed against the intermediate transfer belt 32, and the other of the rollers constitutes one of a plurality of rollers around which the intermediate transfer belt 32 is wound. The image is transferred (secondary transfer) from the intermediate transfer belt 32 pressed and contacted by the secondary transfer roller 33 onto the sheet.

The sheet on which the image has been secondarily transferred is conveyed to the fixing section 34 and is subjected to fixing processing. The fixing section 34 includes a pair of fixing rollers that are pressed against each other. At least one of the fixing section 34 is heatable. The fixing rollers fix the image onto the sheet by applying heat and pressure to the sheet passing between the fixing rollers.

In a case where images are formed on both sides of the sheet, the sheet having the image formed and fixed on one side is sent to an inverting path 36 and turned over. Thereafter, the sheet is returned to a position on an upstream side of the secondary transfer roller 33. In a case where the image formation is performed on only one side or in a case where the image formation on both sides is completed, the sheet is ejected from the fixing section 34 to the post-processing apparatus 4.

The post-processing apparatus 4 performs post-processing on the sheet on which the image has been formed. The post-processing may include, for example, sorting, cutting, stapling, and folding. The sheet after the post-processing is ejected to a discharge tray E or the like.

Figure 2A:
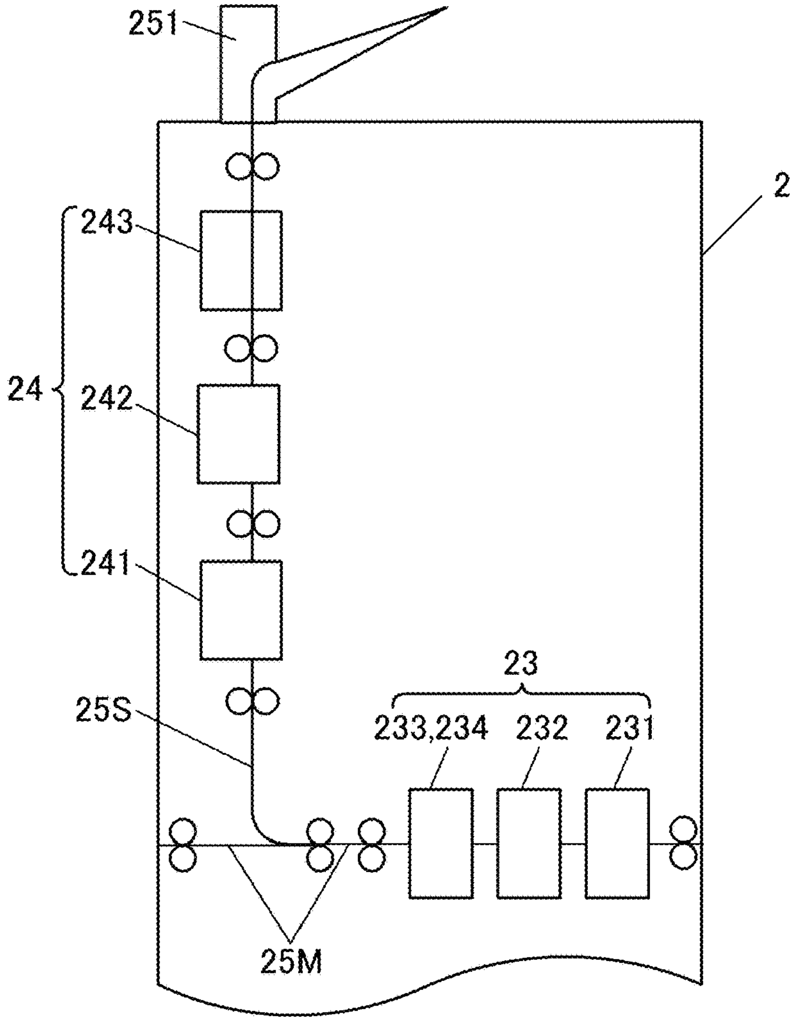
FIG. 2A is a diagram illustrating a detailed configuration of a sheet characteristic detection device.

FIG. 2A is a diagram illustrating a detailed configuration of the sheet characteristic detection device 2.

The sheet characteristic detection device 2 receives the sheet fed from the sheet feed device 1 on the right side of the drawing, and feeds the sheet to the image forming apparatus 3 from the left side of the drawing along a first conveyance path 25M. A second conveyance path 25S is branched from the middle of the horizontally extending first conveyance path 25M. A leading end of the second conveyance path 25S is connected to a purge tray 251.

A first sensing section 23 is located on the first conveyance path 25M. The first sensing section 23 includes a size sensor 231, a paper thickness sensor 232, a basis weight sensor 233, and a moisture percentage sensor 234. The size sensor 231 measures a physical quantity corresponding to a size of the sheet and outputs a measurement result. The size sensor 231 is, for example, an image sensor and detects an edge of the sheet by capturing an image of the conveyed sheet. The image sensor may be one or two line sensors. The sheet thickness sensor 232 measures the physical quantity corresponding to the thickness of the sheet and outputs the measurement result. The basis weight sensor 233 measures the physical quantity corresponding to the basis weight of the sheet and outputs the measurement result. The moisture percentage sensor 234 measures the physical quantity corresponding to an amount of moisture (moisture percentage) of the sheet and outputs the measurement result.

The first sensing section 23 can measure each of the physical quantities while each of the transported sheets is moved at a conveyance speed. That is, the first sensing section 23 obtains the physical quantity related to a characteristic of each sheet in real time during continuous formation of images on a plurality of sheets.

A second sensing section 24 is located on the second conveyance path 25S. The second sensing section 24 includes a stiffness sensor 241, a surface property sensor 242, and a resistance sensor 243. The stiffness sensor 241 measures the physical quantity corresponding to stiffness of the sheet and outputs the measurement result. The surface property sensor 242 measures a presence or absence of coating on the surface of the sheet, a type of coating if any, and a surface property such as surface roughness or smoothness, and outputs the measurement results. The resistance sensor 243 measures electric resistance of the sheet and outputs the measurement result.

Each sensor of the second sensing section 24 performs measurement in a state where the conveyance of the sheet is temporarily stopped. The sheet subjected to the measurement is ejected from the purge tray 251 without being fed to the image forming apparatus 3.

The sheet may be discharged from the purge tray 251 also in a case where it is identified that the measured sheet is a type of sheet that should not be sent to the image forming apparatus 3, based on the measurement result by the first sensing section 23. The types discharged in this case include a type corresponding to a physical property measurement value significantly different from the set control parameter. For example, when different sheets are mixed in a certain sheet feed tray 11, it is detected that the sheets are different from each other based on the measurement result of the first sensing section 23. The sheet is ejected from the purge tray 251, thereby suppressing a jam of the sheet in the image forming apparatus 3 or the like and a reduction in the quality of the formed image.

Figure 2B:
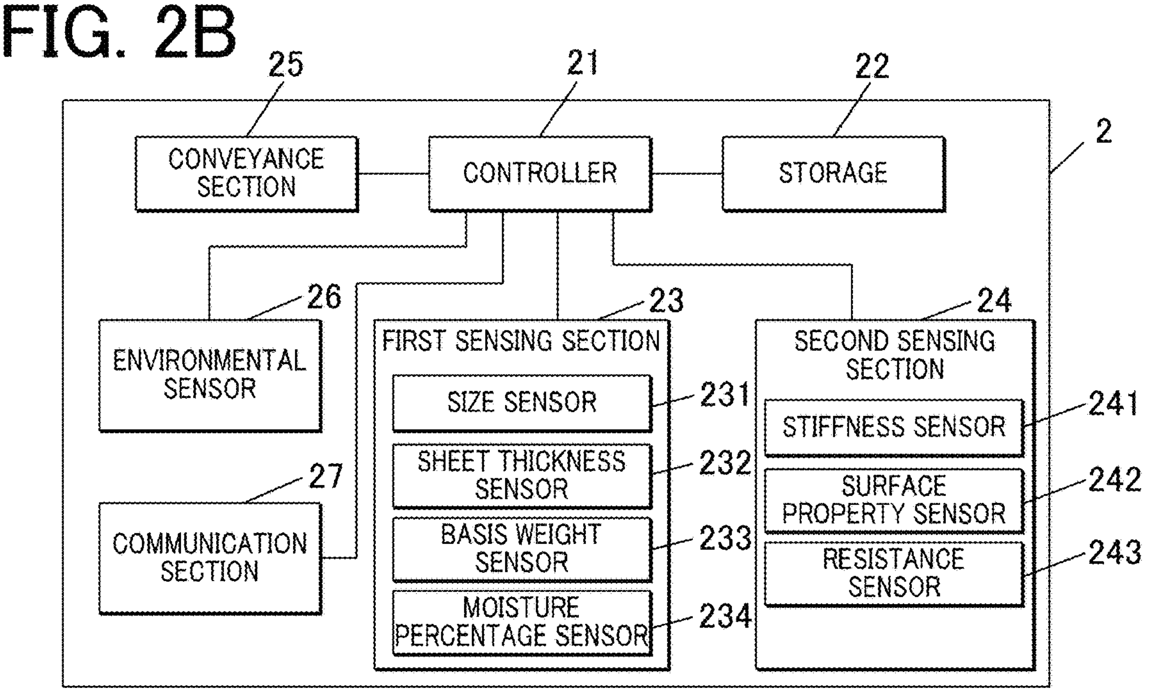
FIG. 2B is a block diagram illustrating a functional configuration of a sheet characteristic detection device.

FIG. 2B is a block diagram illustrating a functional configuration of a sheet characteristic detection device 2. The sheet characteristic detection device 2 includes a controller 21, a storage section 22, an environmental sensor 26, and a communication section 27 in addition to the first sensing section 23, the second sensing section 24, and the conveyance section 25 described above.

The controller 21 comprehensively controls the operation of the sheet characteristic detection device 2. The controller 21 includes a central processing unit (CPU), a random access memory (RAM), and the like. The CPU controls measurement operation by the first sensing section 23 and the second sensing section 24, and conveyance operation of the sheet by the conveyance section 25. The CPU outputs the measurement result to the sheet feed device 1, the image forming apparatus 3, the post-processing apparatus 4, and the like via the communication section 27. The RAM temporarily stores the measurement results by the respective sensors of the first sensing section 23 and the second sensing section 24, and the like.

The storage section 22 stores a control program of a measurement operation by each sensor of the first sensing section 23 and the second sensing section 24, measurement setting data, and the like. The storage section 22 includes a nonvolatile memory such as an HDD or a flash memory.

The environmental sensor 26 measures temperature, humidity, and the like of a space in which the image forming system U is located, and outputs the measurement result.

The communication section 27 controls communication between the sheet characteristic detection device 2 and the sheet feed device 1, the image forming apparatus 3, and the post-processing apparatus 4 in the image forming system U.

FIG. 3 is a block diagram illustrating a functional configuration related to a control operation in the image forming apparatus 3.

In the image forming apparatus 3, a storage section 309 is located so as to be accessible by the controller 301 described above. These are configurations corresponding to the computer of the present embodiment.

The storage section 309 includes a nonvolatile memory such as an HDD or a flash memory. The non-volatile memory stores a program 391, a machine learning model 392, and a sheet type table 393.

The program 391 includes a program for controlling processing such as setting of control parameters related to sheet processing at the time of image forming operation. The machine learning model 392 is used for setting the control parameters. The sheet type table 393 stores the type of sheet (sheet type), reference values of various physical property measurement values corresponding to the sheet type, and a list of suitable control parameters set at the time of image formation on the sheet type. Examples of the sheet type include plain sheet, recycled sheet, high-quality sheet, coated sheet, thick sheet, and thin sheet. The thick sheet, the thin sheet, and the like can include sheets having a plurality of thicknesses. These are classified as similar sheet types. The similar sheet type may be specified by being narrowed down in two stages based on the physical property measurement value.

Next, setting of an image forming operation in the image forming system U will be described.

In order to appropriately apply and fix a color material to a sheet on which an image is formed, a plurality of control parameters related to sheet processing such as a transfer operation and a fixing operation needs to be appropriately defined according to the sheet. What is actually controlled by the control parameters is, for example, the rotation of the motor that operates the roller and the fan, in particular, the torque, the rotation speed, and the like, and the heat generation of the heater, that is, the temperature and the like.

FIG. 4 is a table illustrating some of control parameters and operation settings thereof.

The control parameters are defined for the following sheet processing, respectively. The sheet processing includes sheet conveyance processing such as sheet feed, conveyance, and ejection of the sheet on which the image has been formed. The sheet processing includes image forming processing for forming the image on the sheet, such as conditions for transferring the color material to the sheet and conditions for fixing the color material on the sheet. The sheet processing includes post-processing to be performed on the ejected sheet on which the image has been formed.

As a control parameter of the air sheet feeding, there are a PFU tray tip fan air volume and a PFU tray side fan air volume in a paper feed unit (PFU) for sending out a sheet. These represent the air blowing amounts at the leading end and the side surface of the tray, respectively. By adjusting an air volume according to the mass (density) of the sheets such as thick paper and thin paper, it is possible to appropriately separate and deliver one sheet from a bundle of sheets. Furthermore, the sheet feed control parameters include a PFU registration loop amount. The registration loop amount is an amount by which the sheet is fed for a predetermined time in a state where the leading end of the sheet is in contact with a nip line of the registration rollers. Thus, a loop (warp) is formed on the sheet surface, and the leading edge position of the sheet is aligned. Therefore, the sheet is sent out from the tray in accordance with the setting of the control parameter of the conveyance timing.

Thereafter, at least a part of the plurality of rollers is rotated by a motor, and thus the sheet is moved at the set conveyance speed while being nipped by the plurality of rollers. A nip pressure of the roller can be controlled according to a sheet type such as a thickness and a material of the sheet. These are included in the control parameters related to conveyance.

As a control parameter of the transfer condition, there is a transfer current value for transferring the toner from the intermediate transfer belt 32 to the sheet. As for the transfer current, a transfer trailing edge correction current value and a transfer leading edge correction current value are determined in accordance with different transfer states between the leading edge and the trailing edge of the sheet.

Furthermore, at the time of transfer, a voltage is applied in order to receive the charged toner on the sheet. A separation voltage is applied to the sheet after the transfer so that the sheet after the toner transfer is appropriately separated from the roller and the intermediate transfer belt 32. The AC component and the DC component are the separated AC applied voltage and the separated DC applied voltage, respectively.

Control parameters of the fixing conditions include a heating temperature related to heating and pressing, that is, a set temperature of the fixing rollers (upper and lower). Furthermore, a rotation speed of the fixing roller, an air volume of a fixing separation fan for separating the sheet from the fixing roller, and the like are also set as control parameters of the fixing conditions.

The static electricity is removed from the sheet before being ejected from the image forming apparatus 3 or in the post-processing apparatus 4. Thus, adhesion of the ejected sheet to the tray or another sheet due to static electricity is suppressed. The current value related to the static electricity removal is also a control parameter to be set. In addition, the control parameters related to the post-processing may include setting conditions for the sorting, the cutting, the stapling, the folding, and the like described above.

These control parameters are optimally set from a combination (characteristic information) of a plurality of sheet physical properties. The sheet physical properties are detection results by the various sensors of the sheet characteristic detection device 2 and properties uniquely specified from the detection results. In the image forming system U of the present embodiment, the controller 301 of the image forming apparatus 3 acquires the detection result from the sheet characteristic detection device 2, and sets the control parameter based on the detection result.

Figure 5:
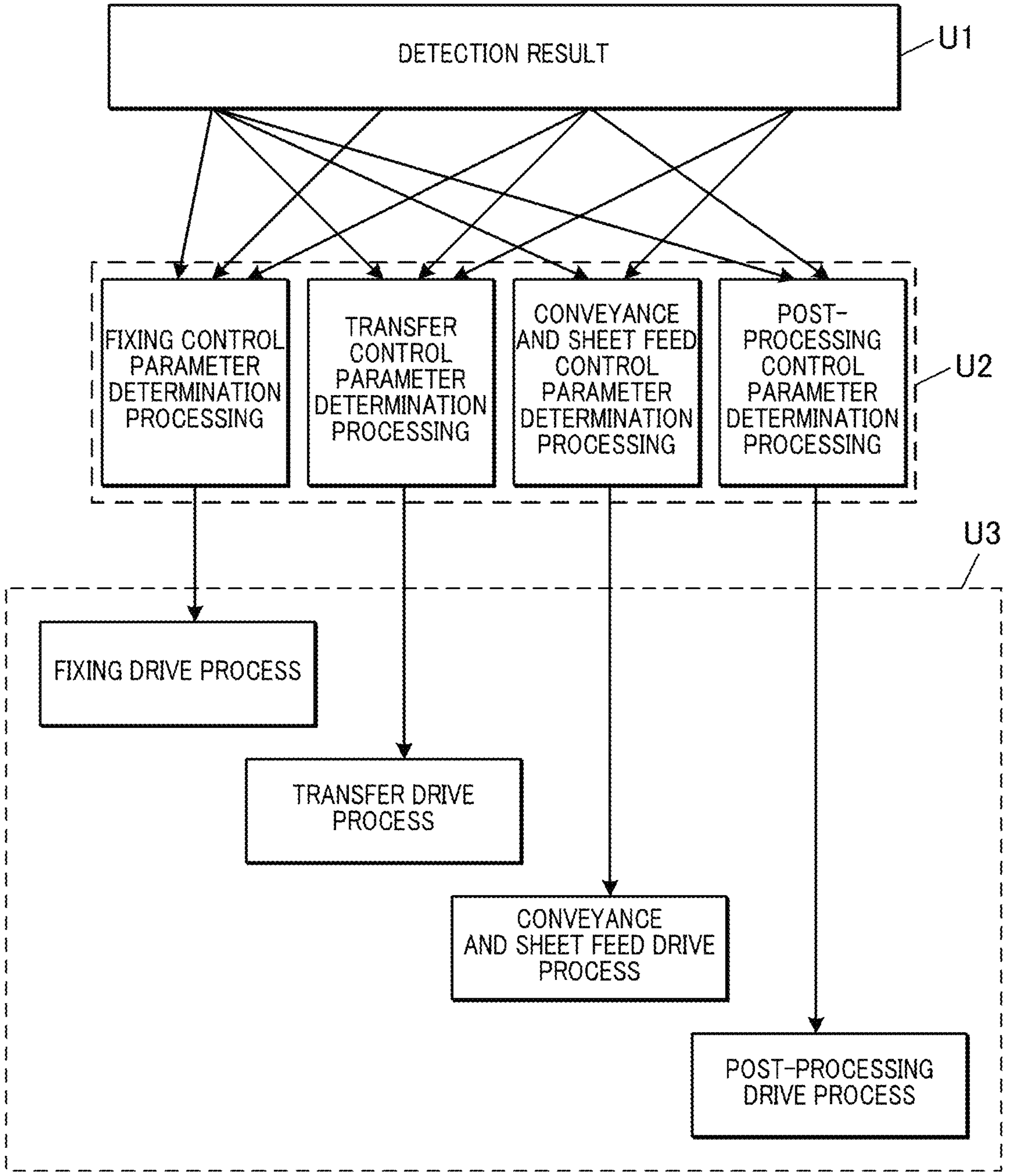
FIG. 5 is a diagram schematically showing a flow of setting the control parameters.

FIG. 5 is a diagram schematically illustrating a flow of setting of control parameters.

The image forming apparatus 3 acquires the detection result from the sheet characteristic detection device 2 (U1).

Among the plurality of physical property measurement values included in the detection result, some or all of the values necessary for determination of the control parameters are passed to the control parameter calculation processing for each category (U2). The control parameter calculation processing includes, for example, conveyance and sheet feed control parameter determination processing, transfer control parameter determination processing, fixing control parameter determination processing, and post-processing control parameter determination processing.

When each of the control parameters is determined, the determined control parameters are updated and stored as the setting of each drive process for each category (U3).

In the image forming system U, these control parameters can be set in two kinds of setting patterns which are different methods from each other.

In the first setting pattern, the value of the control parameter is determined in real time based on the physical property measurement value of the sheet measured by the sheet characteristic detection device 2 immediately before the image formation on the sheet. In this case, even when the physical properties of the sheet change during continuous image formation on a plurality of sheets, the control parameters are set following this change in real time. Thus, the image is appropriately formed.

The machine learning model 392 may be used to set the value of the control parameter in the first setting pattern. The machine learning model 392 outputs the value (setting) of the control parameter in response to an input of the necessary physical property measurement value (characteristic information). The machine learning model 392 has been trained in advance using learning data with teacher data. The learning may be performed outside the image forming system U. Data of the learned machine learning model is acquired from the outside and stored in the image forming apparatus 3 in advance. The machine learning model 392 may be different for each control parameter of the output target. The machine learning model 392 may be updated at appropriate timing. In this case, since the physical property measurement values are directly converted into the values of the control parameters, the type of sheet (sheet type) is not specified from the physical property measurement values.

For the machine learning model 392, for example, any of various algorithms for ensemble learning may be used. Values of the control parameters are selected such that an optimal result is obtained for a combination of a plurality of physical property measurement values. The machine learning model 392 may be trained and used independently for each control parameter. Alternatively, there may be a case where a plurality of control parameters change with correlation therebetween. For such a plurality of control parameters, a common machine learning model may be trained and used.

Alternatively, the setting of the control parameters in the first setting pattern may be performed, for example, by a statistical method without using a machine learning model. Alternatively, the optimal solution of the control parameters may be obtained more analytically using a polynomial regression equation, but in this case, the arithmetic processing tends to be complicated. Therefore, the polynomial regression equation is likely to be used in a case where the number of control parameters obtained by the first setting pattern is small.

In the second setting pattern, the value of the control parameter is initially determined according to the sheet type or a combination of physical property reference values corresponding to the sheet type. In the storage section 309, a list of type names (first type information) for classifying sheet types, combinations of physical property reference values (characteristic information and second type information) corresponding to the sheet types, and control parameters associated with these is held in advance as a sheet type table 393 (sheet type information). For example, the type of sheet having a combination of physical property reference values that is closest to the obtained combination of physical property measurement values is identified. Whether or not the physical property values are the closest to each other may be determined by a distance between vectors when the physical property values are appropriately normalized and converted into multidimensional vectors, for example, a Euclidean distance or the like. Before calculating a specific distance, sheet types to be candidates may be narrowed down by similarity of some control parameters. On the other hand, in a case where there is a significantly different physical property between the physical property reference value and the physical property measurement value, it may be determined to be a different sheet type without considering the distance. The setting content of the control parameter corresponding to this type is determined as the control parameter related to the image formation. In this case, in a standard state of the sheet, the sheet is appropriately conveyed and an image is formed thereon. In these processes, the sheet type itself may not be considered. The sheet type information including the control parameters is registered in advance in a sheet type table 393 for each sheet type. In addition, a new sheet type may be sequentially added and registered in the sheet type information. The additional registration may be manually performed by the user. Alternatively, the additional registration may be performed by automatically acquiring additional content periodically or each time there is an additional contact from a database server or the like that aggregates various sheet type information.

The setting operation by the first setting pattern by the controller 301 corresponds to a first control parameter determination means of the present embodiment. The setting operation according to the second setting pattern by the controller 301 corresponds to a second control parameter determination means of the present embodiment.

Some of the physical property measurement values may change during formation of a plurality of images. For example, the moisture percentage may greatly decrease or increase due to the effect of absorbing heat generated during an image forming operation or surrounding water vapor. Therefore, images may not be appropriately formed on all the sheets with the second setting pattern.

On the other hand, it is difficult to perform all the physical property measurements and all the control parameter settings based on the physical property measurements in real time every time before the image forming operation on each sheet. It is not so preferable to reduce the feeding speed (time interval) of each sheet for the above-described measurement and setting because productivity decreases. In the image forming system U, some of the control parameters are adjusted according to the first setting pattern for each sheet in real time based on the necessary measurement results and are used for each sheet processing. The control parameters other than the some of the control parameters are set according to the second setting pattern before the start of the image forming operation and are continuously used thereafter. That is, during the operation related to image formation, the plurality of control parameters include both of the parameters set by the first setting pattern and the parameters set by the second setting pattern. The controller 301 can set which of the first setting pattern and the second setting pattern is used to determine the value of each control parameter as a selection means of the present embodiment.

In the setting example 1 and the setting example 2 of FIG. 4, the control parameter described as "1" is set in real time by the first setting pattern. The control parameter marked as "2" is initially set once according to the second setting pattern. In this way, for each of the plurality of control parameters, which of the first control parameter determination means and the second control parameter determination means is used to determine the value is set.

In setting example 1, the transfer current value in transfer and the upper fixing control temperature and the lower fixing control temperature in fixing are set according to the first setting pattern. These are important control parameters in image forming processing, in particular, for image quality and stable conveyance. These are set in real time, and thus stable image formation in which image quality is emphasized is likely to be continued while occurrence of sheet jam or the like is reduced. Conversely, the control parameters related to sheet feed (sheet conveyance processing) and post-processing are set in the second setting pattern.

In the setting example 2, the control parameters set in the first setting pattern with respect to the fixing and sheet static elimination are included. All of the control parameters in the sheet feed and the transfer are set with the second setting pattern. In the image forming system U, since the fixing and the sheet static elimination are performed after the transfer, a grace time until the control parameter is set after the measurement is longer than that of the transfer. Therefore, since the settings in the first setting pattern are limited to the control parameters for the fixing and thereafter, the possibility that the image forming speed is adversely affected is reduced. In addition, the fixing process is more likely to affect a difference in final appearance, for example, gloss than the transfer. Therefore, the control parameters related to fixing are preferentially set in the first setting pattern, which tends to reduce the deviation from the originally expected image quality.

The image forming system U may be switchable between the setting example 1 and the setting example 2. The switching may be performed in response to a user's input operation or the like.

Figure 6:
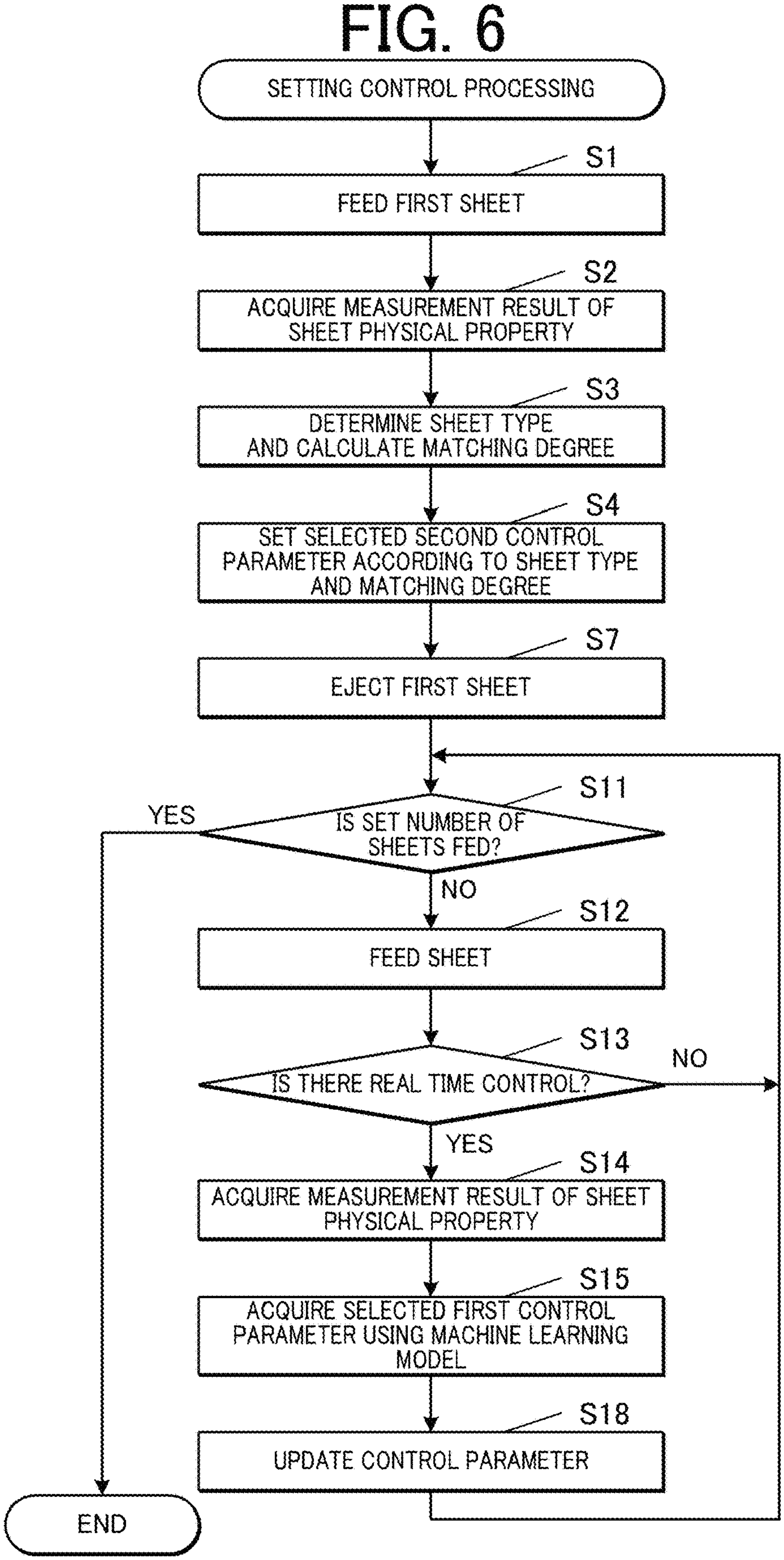
FIG. 6 is a flowchart illustrating a control procedure of setting control processing.

FIG. 6 is a flowchart illustrating a control procedure of setting control processing executed by the controller 301 in the image forming apparatus 3 of the present embodiment. The setting control processing is executed at the start of the image forming operation.

The controller 301 causes the sheet feed device 1 to feed the first sheet from the tray that supplies sheets on which images are to be formed (S1). The controller 301 causes the sheet characteristic detection device 2 to measure the first sheet. The sheet is sent to the second conveyance path 25S, and measurement by the second sensing section 24 is also performed. The controller 301 acquires the measurement results of the sheet physical properties from the sheet characteristic detection device 2 (S2).

The controller 301 determines the sheet type based on the measurement result (S3). The controller 301 refers to the sheet type table 393 to identify a sheet type associated with a combination of physical property reference values closest to the measurement result. Further, the controller 301 calculates the degree of coincidence between the measurement result and the physical property reference value of the specified sheet type. The degree of coincidence may be calculated by any calculation method as long as the degree of coincidence can be quantitatively evaluated.

The controller 301 sets, according to the identified sheet type and matching degree, the value of a control parameter for which the setting of the second control parameter is defined (S4). The processing S4 is included in the second control parameter determination means of the present embodiment. The processing S4 also corresponds to a function as a second control parameter determination means of the controller 301. The controller 301 ejects the first sheet from the second conveyance path 25S to the purge tray 251. Note that the processing S7 may be performed at appropriate timing in parallel with the processing S3 and the S4.

The controller 301 determines whether the set number of sheets for image formation has been fed from the sheet feed device 1 (S11). Note that the number of fed sheets in this case does not include the first sheet described above. If it is determined that the set number of sheets have been fed from the sheet feed device 1 (S11; YES), the controller 301 ends the setting control processing.

If it is determined that the set number of sheets has not been fed from the sheet feed device 1 (S11; NO), the controller 301 causes the sheet feed device 1 to feed the next sheet (S12). The controller 301 causes the sheet to be conveyed from the first conveyance path 25M to the image forming apparatus 3 in the sheet characteristic detection device 2. The controller 301 determines whether or not there is a setting of the first control parameter for real-time control (S13). If it is determined that there is no setting of the first control parameter (S13; NO), the processing by the controller 301 returns to processing S11.

If it is determined that the real-time control is to be performed (S13; YES), the controller 301 acquires the measurement result of the sheet physical property by the first sensing section 23 (S14). The controller 301 inputs the content selected from the measurement result for each first control parameter to be acquired to the corresponding machine learning model 392. The controller 301 acquires the value of the first control parameter output from each machine learning model 392 (S15). The processing S15 constitutes a first control parameter determination step of the present embodiment. The processing S15 also corresponds to a function as a first control parameter determination means of the controller 301. The controller 301 updates the setting of the control parameters with the acquired value of the first control parameter (S18). For the control parameter for which the value of the first control parameter has not been acquired, the value of the second control parameter acquired in the processing S4 is maintained as it is. Thereafter, the processing of the controller 301 returns to the processing S11.

The processes S13 to S14 constitute a selection step of the present embodiment. The processes S13 to S14 also correspond to a function as a selection means of the controller 301.

Modification Example 1

Modification example 1 of the setting control processing will be described.

In the above description, the first control parameters and the second control parameters are fixedly determined at the beginning, but may be changed during the image forming operation.

Examples of control parameters that can be changed between the first setting pattern and the second setting pattern are illustrated in the rightmost column of FIG. 4. That is, the transfer current value can be changed between the setting by the first setting pattern and the setting by the second setting pattern depending on the situation. In this way, whether or not the setting pattern can be changed may be determined depending on whether or not it depends on the measured value of the above-described physical property that is likely to greatly change, or the like. Alternatively, without the settings as described above, parameters set in the first setting pattern may be uniformly changeable to the settings in the second setting pattern.

In addition, in a case where it takes more time for arithmetic processing than originally assumed time, the setting of the first control parameters might not be done in time for actual processing contrary to assumption. The image forming system U determines a setting upper limit time (reference time) of the first control parameter in advance. For a control parameter for which the value of the first control parameter has not been determined within the set upper limit time, the value of the second control parameter may be set instead. Once the setting is changed to the value of the second control parameter, this value may be continuously used.

Figure 7:
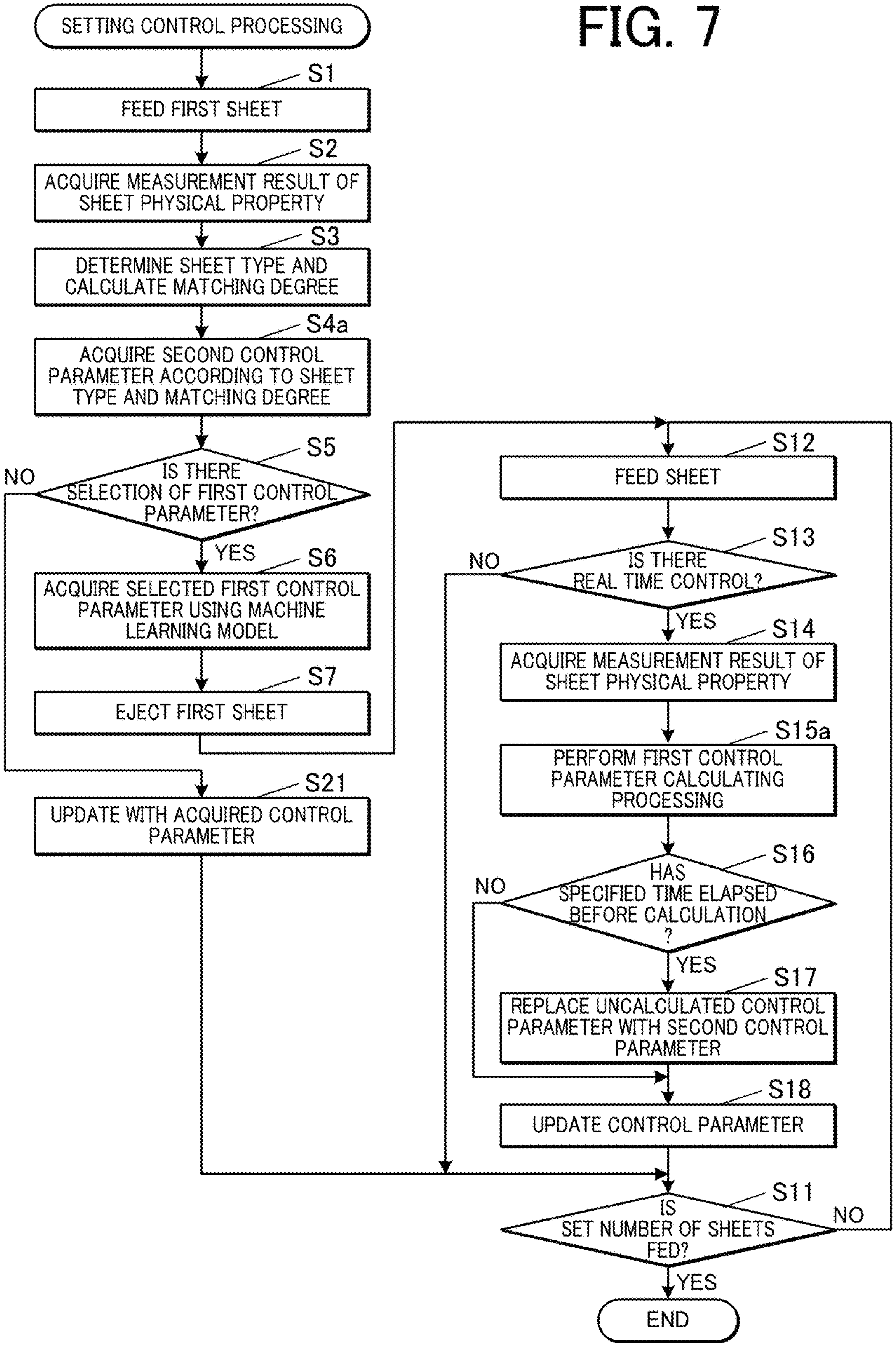
FIG. 7 is a flowchart illustrating a control procedure of the setting control processing of modification example 1.

FIG. 7 is a flowchart illustrating a control procedure of a setting control process according to a first modification example.

In the setting control processing, processing S5, S6, S16, S17, and S21 are added to the setting control processing of the above-described embodiment. In addition, the processes S4 and S15 of the setting control process of the above-described embodiment are changed to a process S4*a* and S15*a*, respectively. In addition, the position of the processing S11 is changed. Other processes are the same between the two setting control processes. The same processing contents are denoted by the same reference numerals, and detailed description thereof will be omitted.

After the processing S3, the controller 301 acquires all the second control parameters according to the sheet type and the matching degree (S4*a*). That is, the controller 301 acquires the second control parameters in advance for the control parameters for which the first control parameters are to be acquired.

The controller 301 determines whether or not there is a control parameter for which the first control parameter is selected (S5). If it is determined that there is no control parameter for which the first control parameter has been selected (S5; NO), the controller 301 updates the setting of the control parameter with the acquired second control parameter (S21). The processing of the controller 301 proceeds to processing S11.

If it is determined that there is a control parameter for which the first control parameter has been selected (S5; YES), the controller 301 inputs necessary measurement results to the machine learning model 392. The controller 301 acquires the value of the selected first control parameter from the machine learning model 392 (S6). Next, the processing of the controller 301 proceeds to processing S7.

If it is determined not to acquire the first control parameter and perform the real-time control in the processing S13 (S13; NO), the processing by the controller 301 proceeds to processing S11. When the real-time control is performed (S13; YES), the process of the controller 301 proceeds to a process S14. After the processing S14, the controller 301 starts the processing of calculating the value of the selected first control parameter (S15*a*).

The controller 301 determines whether a specified time has elapsed before the value of the selected first control parameter is calculated (S16). If it is determined that the specified time has elapsed before the value of the first control parameter is calculated (S16; YES), the controller 301 replaces the uncalculated control parameter with the calculated second control parameter (S17). At this time, the controller 301 changes the selection of the uncalculated first control parameter to the selection of the second control parameter. When all the selections are changed to the second control parameter, the real-time control is stopped. The processing of the controller 301 proceeds to processing S18. If it is determined that the value of the first control parameter has been calculated before the specified time elapsed (S16; NO), the processing by the controller 301 proceeds to processing S18.

In the processing S18, the controller 301 updates the control parameters with the newly obtained first control parameters or the replaced second control parameters (S18). Next, the processing of the controller 301 proceeds to processing S11.

Modification Example 2

Modification example 2 of the setting control processing will be described.

In the above description, the selection of the first control parameter may be changed to the selection of the second control parameter in accordance with the accuracy of the machine learning model 392.

In a case where the physical property measurement value is largely deviated from a normal range, it may be difficult to set an appropriate control parameter by the change in real time. In the case where the machine learning model 392 is used for the first setting pattern as described above, the amount of learning data outside of the normal range is generally small in many cases. That is, the machine learning model 392 is not learned with high accuracy outside the normal range. The image forming apparatus 3 defines in advance an allowable range of a physical property measurement value in which the machine learning model 392 can be used with necessary accuracy. It is sufficient that this range be defined for each of a plurality of control parameters. When input data outside the defined range is acquired, the controller 301 stops the setting of the control parameters in the first setting pattern. In this case, the controller 301 uses the control parameters obtained in the second setting pattern. The control parameter obtained in the second setting pattern may be acquired in advance.

Figure 8:
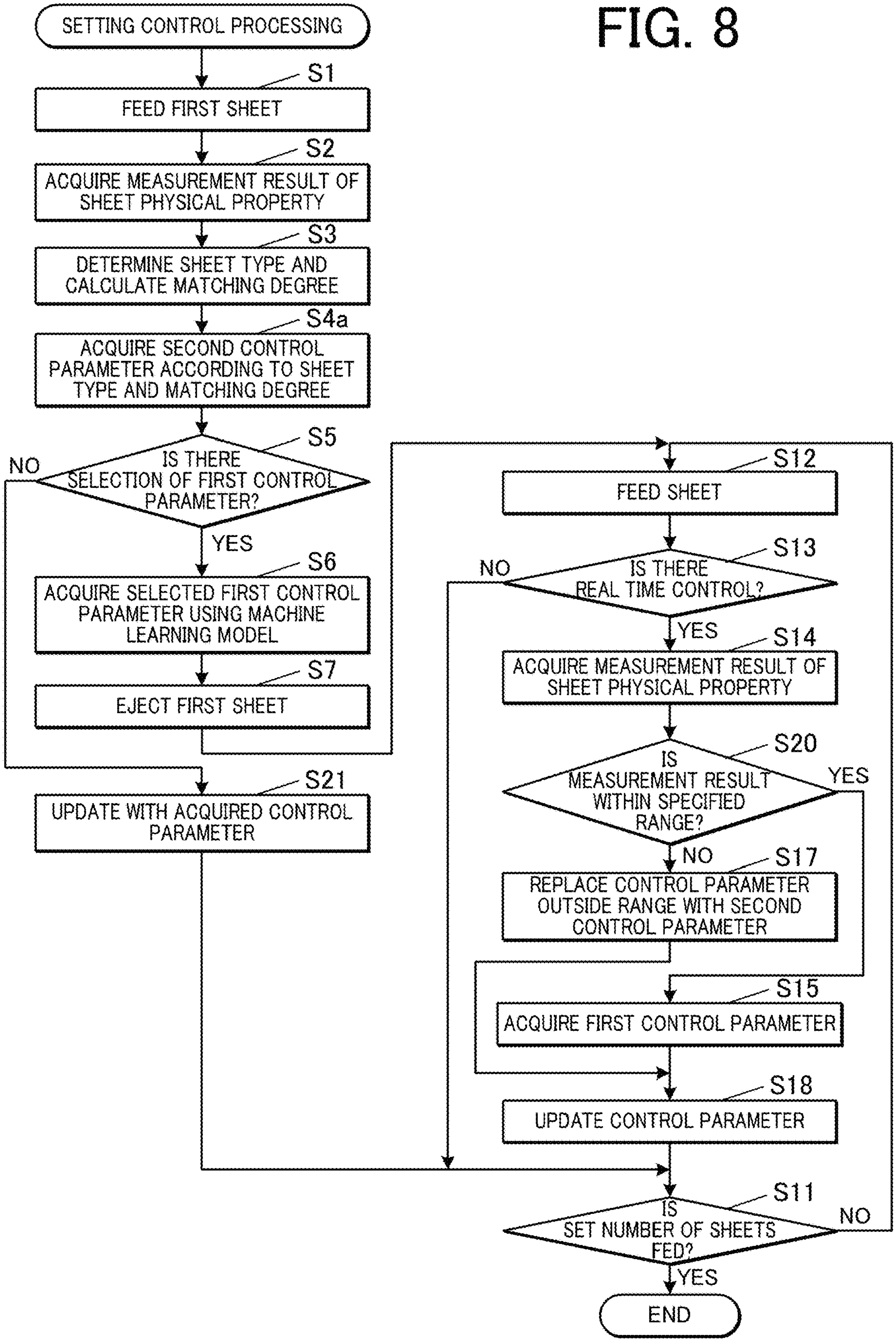
FIG. 8 is a flowchart illustrating a control procedure of the setting control processing of modification example 2.

FIG. 8 is a flowchart illustrating a control procedure of the setting control processing of modification example 2.

The setting control processing includes processing S16 instead of processing S20 in the setting control processing of modification example 1. Furthermore, the setting control processing includes the processing S15*a* of the present embodiment described above instead of the processing S15 in modification example 1. The process S20 is executed before the processes S15 and S16. The other processing is the same between modification examples 1 and 2. The same processing contents will be denoted by the same reference numerals and the description thereof will be omitted.

After the processing S14, the controller 301 determines whether or not the acquired measurement result is within a specified range (S20). When the measurement result is not within the defined range (S20; NO), the processing by the controller 301 proceeds to processing S17. When the measurement result is within the defined range (S20; YES), the processing by the controller 301 proceeds to processing S15. Note that in a case where whether or not a plurality of control parameters are within the defined ranges is divided, one of processing S15 and processing S17 may be individually performed for each control parameter. After the processing S15 or S17, the processing of the controller 301 proceeds to the processing S18.

As described above, the image forming system U of the present embodiment includes the image forming apparatus 3, and the image forming apparatus 3 includes the controller 301. The controller 301 as the first control parameter determination means determines the value of the control parameter for sheet processing. The controller 301, as the second control parameter determination means, determines the value of the control parameter for sheet processing by a method different from that of the first control parameter determination means. The controller 301, as the selection means, can set which of the first control parameter determination means and the second control parameter determination means is used to determine the value of at least one of the plurality of control parameters.

There are many control parameters related to image formation. When an attempt is made to uniformly optimize a combination of these on the basis of data on a large number of sheet physical properties, the amount of calculation may become large. As a result, it is difficult for the image forming system to reflect the optimized control parameters in real time during the high-speed image forming operation. Therefore, there is a desire to enable more appropriate operation settings related to image formation while suppressing a decrease in productivity. In contrast, the image forming system U can use two different methods of determining control parameters in combination and select and set which of the methods is to be used. Therefore, the control parameters are more preferably determined in accordance with the importance of each control parameter, the degree of variation of the physical property measurement values for determining the control parameters, and the like. Thus, the image forming system U can perform operation setting related to image formation more appropriately without reducing productivity. Therefore, the image forming system U can output a stable image with higher accuracy.

Furthermore, as a first control parameter determination means, the controller 301 can determine, based on the characteristic information corresponding to the sheet physical properties, the values of the control parameters for the sheet processing without identifying the sheet type. Thus, the controller 301 can determine the control parameters by appropriately reflecting the variation within the sheet type, in particular, the sheet physical property which tends to change with time, such as the moisture percentage. Therefore, the image forming system U can suppress the occurrence of sheet conveyance trouble during image formation. Further, the image forming system U can appropriately maintain the image quality of the formed image.

Furthermore, the controller 301 as the second control parameter determination means may determine the value of the control parameter for sheet processing according to sheet type information corresponding to the sheet type. Conversely to the above, the control parameters that are generally fixed according to the sheet type may be determined to be values according to the sheet type, a combination of the physical property measurement values associated with the sheet type, or the like. Accordingly, the controller 301 can reduce the load and the required time related to the setting of the control parameter. On the other hand, troubles related to image formation are easily suppressed.

In addition, the sheet type information may include a sheet type specified based on characteristic information obtained by combining physical property measurement values and the like. As long as a combination of physical property measurement values by which a sheet type is uniquely determined is defined, name information on the sheet type itself is not necessarily required for setting of control parameters. However, since the sheet type itself can be specified, the user can easily determine the suitability when the user confirms the setting contents.

The sheet type information may also include information associating the identified sheet type with the value of the control parameter. The value of an appropriate control parameter is directly associated with a sheet type, so that the image forming system U can easily and promptly obtain a control parameter corresponding to the sheet type. In principle, the physical properties of sheet are not continuous, but change discontinuously among different sheet types. Therefore, the image forming system U can appropriately set standard control parameters according to the sheet type by being associated with the control parameters in units of the sheet type.

The sheet type information may also include information associating the characteristic information with the value of the control parameter. As described above, as long as the combination of physical property measurement values by which the sheet type is uniquely determined is defined, name information on the sheet type itself is not necessarily required for setting of control parameters. The image forming system U can directly and easily obtain appropriate control parameters from the combination of physical property measurement values.

Furthermore, the sheet processing may include at least one of image formation processing for forming the image on the sheet, sheet conveyance processing for feeding or conveying the sheet, and post-processing to be performed on the sheet after image formation. Appropriate control parameters are set for these processes, so that the image forming system U can effectively reduce the occurrence of troubles related to sheets. Further, the image forming system U can form the image of appropriate image quality on the sheet.

In particular, the sheet processing may include image forming processing for forming the image on the sheet. The controller 301 determines, as the first control parameter determination means, the control parameter for the image formation processing. Control parameters related to image formation processing greatly affect image quality. At the same time, these control parameters are important for appropriately separating the sheet from the roller or the like while causing the color material to adhere to the sheet. Therefore, the image forming system U can more reliably form the image with optimum control parameters. In addition, the image forming system U can more reliably discharge the sheet on which the image is formed.

Furthermore, the control parameters for the image formation processing may include at least one of control parameters related to fixing conditions of the color material to the sheet and control parameters related to transfer conditions of the color material to the sheet. Transfer and fixing of the color material to the sheet is particularly important in image formation. When these are appropriately defined, the image forming system U can stably form the image with higher image quality.

Furthermore, the sheet processing may include at least one of sheet conveyance processing for feeding or conveying the sheet and post-processing to be performed on the sheet after image formation. The controller 301 may, as second control parameter determination means, determine the control parameter for the at least one process. Thus, the number of control parameters set according to the first setting pattern can be reduced. Therefore, the image forming system U can reduce the time and load required for setting the control parameters while maintaining appropriate image formation. Thus, the image forming system U can assign more effective control parameter settings to the first setting pattern. Further, the image forming system U can form a high-quality image without reducing the image forming speed, that is, the productivity.

Furthermore, the control parameters determined by the controller 301 as the second control parameter determination means may include at least one of the conveyance speed of the sheet, the conveyance timing, the loop amount, and the nip pressure. For these control parameters, accuracy of values generally corresponding to the sheet type information is sufficient. Therefore, since these are defined by the second setting pattern, the burden of the setting is reduced. Furthermore, since these control parameters are used from the start of the conveyance of the sheet, they need to be already determined in a situation where the physical property measurement values are acquired by the sheet characteristic detection device 2. That is, the control parameter that cannot be set in time by the first setting pattern may be preferentially allocated to the setting by the second setting pattern.

Furthermore, the control parameters determined by the controller 301 as the second control parameter determination means may include at least one of conditions related to stapling, folding, and cutting. The post-processing is performed after the image is formed on the sheet. Therefore, these parameters are less likely to require detailed setting than various control parameters related to the image forming operation. These are preferentially allocated to the second setting pattern, so that the image forming system U can set more effective control parameters by the first setting pattern.

The characteristic information may include information corresponding to at least one of basis weight, thickness, moisture percentage, surface properties, electrical resistance, and size. These are important physical properties of the sheet, in particular, for conveyance of the sheet and application and fixing of the color material. Therefore, the image forming system U can determine optimal control parameters more accurately by determining control parameters based on characteristic information that includes these as much as possible.

The controller 301 may include, as the first control parameter determination means, the machine learning model 392 that outputs the control parameter in response to input of the characteristic information. In order to identify an empirical optimum solution from a combination of many physical property measurement values, it is useful to use the machine learning model. As a result, the image forming system U can set the control parameter based on a large number of physical property measurement values so that an appropriate image can be formed without deteriorating the image quality.

Alternatively, the controller 301 may output, as the first control parameter determination means, the control parameter corresponding to the characteristic information without using the machine learning model. If it is possible to determine appropriate control parameters from a combination of many physical property measurement values by a statistical method or the like, the controller 301 does not needs to use the machine learning model. For example, in the machine learning model, in the case of an exceptional physical property measurement value, the value of the control parameter is not simply extrapolated, and an unusual setting may be performed. Since no machine learning model is used, the image forming system U can set the control parameters more stably.

Furthermore, as the second control parameter determination means, the controller 301 may determine the control parameters based on the control parameters registered in advance in association with the sheet type information. Since the relationship between the control parameter and the sheet type information is registered and set in advance, the image forming system U can reliably and easily obtain an appropriate control parameter for a necessary sheet type.

Furthermore, the sheet type information may include first type information classified by the type name of the sheet. As described above, the standard physical properties change discontinuously for each sheet type. Therefore, the image forming system U can appropriately classify the sheets by classifying the sheets according to the type name of the sheet type.

The sheet type information may include second type information in which the type of sheet is classified by the combination of characteristic information of the plurality of different types. On the other hand, according to the combination of the physical property reference values for each sheet, the sheets can be appropriately classified without classifying the sheets by clearly indicating the type name. In this case, the physical property reference values can also be defined as ranges. By setting a wider range of the physical property reference value for the sheet having a large variation, the image forming system U can classify sheets more reliably.

Furthermore, the values of the plurality of control parameters to be determined may include both the value determined by the first setting pattern and the value determined by the second setting pattern. That is, not all of the control parameters may be defined by only one of the first setting pattern and the second setting pattern. The image forming system U may selectively set, according to the first setting pattern, the control parameter that requires detailed control such as a large variation during image formation. Thus, the image forming system U can prevent a decrease in productivity due to an increase in the time for setting the control parameters, and can make it less likely that a decrease in the image quality of the formed image and conveyance trouble of the sheet will occur.

Furthermore, as the first control parameter determination means, the controller 301 may determine the value of the control parameter on the basis of sheet characteristic information obtained for each fed sheet. The sheet processing is performed using the value of the control parameter determined for each sheet. That is, the image forming system U may adjust the control parameters in real time for each sheet. Thus, the image forming system U can set the control parameters while appropriately reflecting changes in physical property values, such as the moisture percentage, which tend to greatly fluctuate during image formation. Therefore, the image forming system U can obtain images with stable image quality on many sheets.

In addition, the controller 301 may be able to change the setting of the method of determining the control parameter in the middle of the image forming process as a selection means. For example, in the first setting pattern, there is a situation where the determination accuracy of the control parameter cannot be obtained. In such a case, the setting is switched, so that the image forming system U can keep deterioration in image quality and increase in conveyance trouble of sheets small.

Furthermore, as a selection means, the controller 301 may be able to set which of the first setting pattern and the second setting pattern is used to determine the value of each of the plurality of control parameters. Important control parameters can change depending on which part of the image quality of a formed image is particularly emphasized by the user. The image forming system U can select, from among the plurality of control parameters, the control parameter to be determined according to the first setting pattern. Thus, the image forming system U can flexibly form the image having desired image quality in accordance with the intention of the user.

Furthermore, the controller 301 as the selection means may switch the control parameter whose value cannot be determined with the first setting pattern within the reference time to determination of the value with the second setting pattern. Depending on the method of determining the control parameter by the first setting pattern, the time required for calculating the control parameter may vary depending on the combination of the physical property measurement values. Even in such a case, the image forming system U can appropriately determine the control parameters while avoiding a decrease in the productivity of image formation.

A control parameter setting method according to the present embodiment includes the following steps. (1) A first control parameter determination step of determining values of control parameters for sheet processing. (2) A second control parameter determination step of determining the value of a control parameter for sheet processing by a method different from that of the first control parameter determination means. (3) a selection step of enabling setting as to which of the first control parameter determination step and the second control parameter determination step is to be used to determine the value of at least one of the plurality of control parameters.

According to such a method of setting control parameters, two different methods of determining control parameters can be used in combination, and one of the methods can be selected and set. Therefore, the control parameter setting method can more preferably determine the control parameters in accordance with the labor and time required for the setting, the desired image quality, and the like. Accordingly, the control parameter setting method of the present embodiment can output the stable image with higher accuracy.

In addition, the program 391 of the present embodiment related to the setting of the control parameters can be easily installed in a computer and executed. Therefore, by using the program 391, it is possible to easily and flexibly obtain the control parameter with higher accuracy even when the computer does not have a special control configuration.

Note that the present invention is not limited to the embodiment described above, and various modifications can be made.

For example, in the above description, the sheet type (name), the combination of the physical property reference values, and the combination of the control parameters are associated with each other in the sheet type table 393, but the present invention is not limited thereto. For example, the name of the sheet type may not be specified. A table in which combinations of sheet type and physical property reference value are defined and a table in which combinations of sheet type and control parameter are defined may be held as separate data.

A combination of the control parameter defined by the first setting pattern and the control parameter defined by the second setting pattern may not be specified in advance. The user may be able to set which of the setting patterns is to be used in any combination to determine the control parameters. In this case, the machine learning model for the control parameters set in the first setting pattern may be acquired from the outside. The maximum number of control parameters that can be set for the first setting pattern may also be set.

Furthermore, the selection between the first setting pattern and the second setting pattern may be collectively changed for all the switchable parameters.

Furthermore, the control parameters are not limited to the above-described examples. Various other control parameters can be set in the sheet processing.

In addition, a part of the characteristic information related to the physical properties may not be directly measured by the sheet characteristic detection device 2. A value calculated based on the measured value may be included in the characteristic information. Furthermore, the characteristic information may include values related to physical properties that are not exemplified above. For example, whiteness degree of the surface, air permeability of the sheet, and the like may be included.

In the above embodiment, an example in which ensemble learning is used as the machine learning model 392 has been described, but the present invention is not limited thereto. Other learning algorithms may be used/combined.

In addition, in the above-described embodiment, the control parameter is determined based on the physical property measurement value for each sheet, but the invention is not limited thereto. The control parameter may be determined for every predetermined number of sheets, for example, for every two sheets. In this case, the control parameter may be determined based on a representative value such as an average of each of the physical property measurement values for a predetermined number of sheets. Furthermore, the control parameters determined for each sheet and the control parameters determined for each of a plurality of sheets may coexist.

Furthermore, in the above-described embodiment, control parameters that have been changed from the first setting pattern to the second setting pattern once are not allowed to be changed back to the first setting pattern afterwards. However, it is not limited to this. In a case where the acquisition of the physical property measurement values by the sheet characteristic detection device 2 is continued and the physical property measurement values return after once deviating from the usable range, the setting pattern may be returned to the first setting pattern.

Furthermore, in the above description, the values of the control parameters according to the second setting pattern are also determined based on the physical property measurement values of the sheet characteristic detection device 2, but are not limited thereto. In a case where a user has specified a sheet type in response to an input operation, values of the control parameters may be determined in accordance with the sheet type.

Furthermore, although the controller 301 of the image forming apparatus 3 acquires the physical property measurement values from the sheet characteristic detection device 2 and determines the values of the control parameters in the above embodiment, it is not limited thereto. The controller 21 of the sheet characteristic detection device 2 may perform processing for determining the values of the control parameters. Alternatively, the image forming system U may include a control unit for determining the value of the control parameter, separately from the controller 301 of the image forming apparatus 3.

Furthermore, although the sheet characteristic detection device 2 is independently positioned between the sheet feed device 1 and the image forming apparatus 3 in the image forming system U described above, it is not limited thereto. The first sensing section 23 and the second sensing section 24 may be components of the sheet feed device 1 or the image forming apparatus 3.

Furthermore, in the above description, the storage section 309 including a nonvolatile memory such as an HDD or a flash memory has been described as an example of a computer-readable medium that stores the program 391 according to the setting control of the present invention, but the computer-readable medium is not limited thereto. As other computer-readable media, other nonvolatile memories such as an MRAM and portable recording media such as a CD-ROM and a DVD disk can be applied. As a medium for providing data of the program according to the present invention via a communication line, a carrier wave is also applied to the present invention.

In addition, the specific configurations, the contents and procedures of the processing operations, and the like described in the above embodiment can be appropriately changed without departing from the spirit and scope of the present invention. It is intended that the scope of the present invention includes the scope of the invention described in the scope of the claims and the scope of equivalents thereof.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-150666, filed on Sep. 19, 2023, including description, claims, drawings and abstract is incorporated herein by reference.

What is claimed is:

1. An image forming system comprising:

a hardware processor, wherein the hardware processor is configured to perform, a first control parameter determination operation that determines a value of a control parameter for sheet processing;

a second control parameter determination operation that determines the value of the control parameter for the sheet processing by a method different from the first control parameter determination operation; and a selection operation configured to be capable of selecting which of the first control parameter determination operation and the second control parameter determination operation based on a setting information that one of the first control parameter determination operation and the second control parameter determination operation is set for each of a plurality of the control parameters.

2. The image forming system according to claim 1, wherein the first control parameter determination operation determines the value of the control parameter for the sheet processing without identifying a sheet type, based on a characteristic information corresponding to a physical property of a sheet.

3. The image forming system according to claim 2, wherein the second control parameter determination operation determines the value of the control parameter for the sheet processing in accordance with sheet type information corresponding to the sheet type.

4. The image forming system according to claim 3, wherein the sheet type information includes a sheet type specified based on the characteristic information.

5. The image forming system according to claim 2, wherein the characteristic information includes information corresponding to at least one of basis weight, thickness, moisture percentage, surface property, electrical resistance, and size.

6. The image forming system according to claim 2, wherein the first control parameter determination operation includes a machine learning model that outputs the control parameter in response to input of the characteristic information.

7. The image forming system according to claim 2, wherein the first control parameter determination operation determines the value of the control parameter based on the characteristic information of the sheet obtained for each sheet to be fed, and the sheet processing is performed using the value of the control parameter determined for each sheet.

8. The image forming system according to claim 7, wherein the selection operation switches to determination of the value by the second control parameter determination operation for the control parameter whose value cannot be determined by the first control parameter determination operation within a reference time.

9. The image forming system according to claim 1, wherein the sheet processing includes at least one of image formation processing to form an image on a sheet, sheet conveyance processing to feed or convey the sheet, and post-processing to be performed on the sheet after image formation.

10. The image forming system according to claim 1, wherein, the sheet processing includes image formation processing to form an image on a sheet, and the first control parameter determination operation determines the control parameter for the image formation processing.

11. The image forming system according to claim 10, wherein the control parameter for the image formation processing include at least one of the control parameter related to a fixing condition of a color material to the sheet and the control parameter related to a transfer condition of the color material to the sheet.

12. The image forming system according to claim 1, wherein, the sheet processing includes at least one of sheet conveyance processing to feed or convey a sheet and post-processing to be performed on the sheet after image formation, and the second control parameter determination operation determines the control parameter for the at least one processing.

13. The image forming system according to claim 12, wherein, the sheet processing includes sheet conveyance processing to feed or convey the sheet, and the control parameter determined by the second control parameter determination operation include at least one of a conveyance speed of the sheet, a conveyance timing, a loop amount, and a nip pressure.

14. The image forming system according to claim 12, wherein, the sheet processing includes post-processing to be performed on the sheet after image formation, and the control parameter determined by the second control parameter determination operation includes at least one of a condition relating to stapling, folding, and cutting.

15. The image forming system according to claim 1, wherein the second control parameter determination operation determines the control parameter based on the control parameter registered in advance in association with sheet type information.

16. The image forming system according to claim 1, wherein the values of the plurality of control parameters to be determined include both the value determined by the first control parameter determination operation and the value determined by the second control parameter determination operation.

17. The image forming system according to claim 1, wherein, the sheet processing includes image formation processing to form an image on a sheet, and the selection operation is capable of changing the setting midway of the image formation processing.

18. A control parameter setting method comprising:

first control parameter determining that determines a value of a control parameter for sheet processing;

second control parameter determining that determines the value of the control parameter for the sheet processing by a method different from the first control parameter determining; and selecting capable of selecting which of the first control parameter determination operation and the second control parameter determination operation based on a setting information that one of the first control parameter determination operation and the second control parameter determination operation is set for each of a plurality of the control parameters.

19. A non-transitory computer readable recording medium storing a program causing a computer to perform:

first control parameter determining that determines a value of a control parameter for sheet processing;

second control parameter determining that determines the value of the control parameter for the sheet processing by a method different from the first control parameter determining; and selecting capable of selecting which of the first control parameter determination operation and the second control parameter determination operation based on a setting information that one of the first control parameter determination operation and the second control parameter determination operation is set for each of a plurality of the control parameters.

* * * * *